US009322582B2

(12) United States Patent
Zhan et al.

(10) Patent No.: US 9,322,582 B2
(45) Date of Patent: Apr. 26, 2016

(54) ELECTRONIC EXPANSION VALVE

(75) Inventors: Caiyi Zhan, Zhejiang Province (CN); Ze Yuan, Zhejiang Province (CN); Xianrang Wei, Zhejiang Province (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 0 days.

(21) Appl. No.: 14/397,415

(22) PCT Filed: Aug. 10, 2012

(86) PCT No.: PCT/CN2012/079930
§ 371 (c)(1),
(2), (4) Date: Oct. 27, 2014

(87) PCT Pub. No.: WO2013/166791
PCT Pub. Date: Nov. 14, 2013

(65) Prior Publication Data
US 2015/0122360 A1    May 7, 2015

(30) Foreign Application Priority Data

May 11, 2012 (CN) .......................... 2012 1 0147187

(51) Int. Cl.
*F16K 39/02* (2006.01)
*F25B 41/06* (2006.01)
(Continued)

(52) U.S. Cl.
CPC ............. *F25B 41/062* (2013.01); *F16K 3/265* (2013.01); *F16K 11/10* (2013.01); *F16K 31/04* (2013.01);
(Continued)

(58) Field of Classification Search
CPC ............. F25B 41/062; F25B 2341/061; F25B 2341/065; F16K 3/265; F16K 11/10; F16K 31/0613; F16K 31/04; F16K 39/024; Y10T 37/8696
See application file for complete search history.

(56) References Cited

U.S. PATENT DOCUMENTS 2,345,306 A    3/1944   Van Der Werff
5,626,030 A    5/1997   Nagai
(Continued)

FOREIGN PATENT DOCUMENTS

CN    1132328 A    10/1996
CN    1297518 A    5/2001
(Continued)

OTHER PUBLICATIONS

International Search Report dated Feb. 28, 2013 from potentially related International Application No. PCT/CN2012/079933.
(Continued)

*Primary Examiner* — Jessica Cahill
(74) *Attorney, Agent, or Firm* — Wolf, Greenfield & Sacks, P.C.

(57) ABSTRACT

An electronic expansion valve is provided, which includes a main valve cavity. A sleeve is fixed in the main valve cavity. A lower end part of the sleeve is supported by a valve seat, and the lower end part of the sleeve surrounds a main valve port. A valve core seat is axially movably arranged in the sleeve. A lower part of the valve needle component extends into the sleeve to open and close the valve core valve port. A circumferential side wall of the sleeve is provided with a first communicating hole close to the main valve port and a second communicating hole away from the main valve port. The structural design of the electronic expansion valve may prevent an excessive impact on a valve core seat caused by the refrigerant with high pressure when the refrigerant flows forward, thereby preventing the eccentricity of the valve core seat.

20 Claims, 8 Drawing Sheets

(51) Int. Cl.
*F16K 3/26* (2006.01)
*F16K 11/10* (2006.01)
*F16K 31/06* (2006.01)
*F16K 31/04* (2006.01)

(52) U.S. Cl.
CPC ........... *F16K 31/0613* (2013.01); *F16K 39/024* (2013.01); *F25B 2341/061* (2013.01); *Y10T 137/8696* (2015.04)

(56) References Cited

U.S. PATENT DOCUMENTS

| | | | | |
|---|---|---|---|---|
| 5,669,413 | A | * 9/1997 | Hegglin | ................ F25B 41/062 137/554 |
| 2005/0034770 | A1 | * 2/2005 | Stares | .................... F16K 3/246 137/625.3 |
| 2009/0293520 | A1 | 12/2009 | Hayashi et al. | |
| 2011/0012038 | A1 | * 1/2011 | Lv | ......................... F16K 31/047 251/129.01 |
| 2011/0084224 | A1 | * 4/2011 | Zhan | .................... F25B 41/062 251/129.01 |
| 2011/0120161 | A1 | * 5/2011 | Hayashi | ................ F25B 41/062 62/160 |

FOREIGN PATENT DOCUMENTS

| | | | |
|---|---|---|---|
| CN | 200968423 | Y | 10/2007 |
| CN | 101403438 | A | 4/2009 |
| CN | 201327255 | Y | 10/2009 |
| CN | 102042416 | A | 5/2011 |
| CN | 102252119 | A | 11/2011 |
| CN | 202182593 | U | 4/2012 |
| GB | 1279753 | A * 6/1972 | ............. F16K 3/246 |
| JP | 2001153236 | A | 6/2001 |
| JP | 2006316835 | A | 11/2006 |
| JP | 4285155 | B2 | 4/2009 |
| JP | 2009287913 | A | 12/2009 |
| JP | 2012047213 | A | 3/2012 |
| KR | 100552942 | B1 | 2/2006 |

OTHER PUBLICATIONS

International Search Report dated Feb. 28, 2013 from potentially related International Application No. PCT/CN2012/079927.
International Search Report dated Feb. 28, 2013 from corresponding International Application No. PCT/CN2012/079930.
Chinese Office Action, dated Dec. 23, 2015, from Chinese Patent Application No. 201210147187.9.

* cited by examiner

ELECTRONIC EXPANSION VALVE

The present application is the national phase of International Application No. PCT/CN2012/079930, filed on Aug. 10, 2012, which claims the benefit of priority to Chinese Patent Application No. 201210147187.9 titled [ELECTRONIC EXPANSION VALVE], filed with the Chinese State Intellectual Property Office on May 11, 2012, the entire disclosures of both applications are incorporated herein by reference.

TECHNICAL FIELD

The present application relates to the technical field of fluid control components, and particularly to an electronic expansion valve.

BACKGROUND

In the air conditioner market, two electronic expansion valves are employed since an indoor unit is disposed far away from an outdoor unit of an air conditioner. In addition, each of the two electronic expansion valves is required to be connected to a respective one-way valve in parallel to improve the system efficiency to the greatest extent. The schematic diagram of the system of the air conditioner is shown in FIG. 1, and the working principle is briefly described as follows.

The refrigerating operation is described as follows. Gaseous refrigerant with high temperature and high pressure which is discharged from a gas discharge pipe of a compressor 7'8 passes through, in turn, a connecting pipe D and a connecting pipe E of a four-way valve 7'1, an outdoor heat exchanger 7'2 (releasing heat by condensation), a first one-way valve 7'4 (here, a first electronic expansion valve 7'3 does not function to regulate the flow), and a second electronic expansion valve 7'5 (here, a second one-way valve 7'6 is closed, and the second electronic expansion valve 7'5 functions to regulate the flow), and finally enters into an indoor heat exchanger 7'7 to be evaporated, so as to absorb heat to realize the refrigerating function. Here, the second electronic expansion valve 7'6 is close to the indoor heat exchanger 7'7, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the outdoor heat exchanger 7'2 passes through the first electronic expansion valve 7'3, a throttling effect may still occur even when the expansion valve is fully opened, which reduces the pressure of the refrigerant, and then when the refrigerant is transferred to the second electronic expansion valve 7'5, it is apt to be gasified partly, therefore the throttling effect of the electronic expansion valve is adversely affected, and the system efficiency is reduced.

The heating operation is described as follows. Gaseous refrigerant with high temperature and high pressure which is discharged from the gas discharge pipe of the compressor 7'8 passes through, in turn, the connecting pipe D and a connecting pipe C of the four-way valve 7'1, the indoor heat exchanger 7'7 (releasing heat by condensation), the second one-way valve 7'6 (here, the second electronic expansion valve 7'5 does not function to regulate the flow), the first electronic expansion valve 7'3 (here, the first one-way valve 7'4 is closed, and the first electronic expansion valve 7'3 functions to regulate the flow), and finally enters into the outdoor heat exchanger 7'2 to be evaporated, so as to absorb heat to realize the refrigerating function. Here, the first electronic expansion valve 7'3 is close to the outdoor heat exchanger 7'2, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the indoor heat exchanger 7'7 passes through the second electronic expansion valve 7'5, the throttling effect may still occur even when the expansion valve is fully opened, which reduces the pressure of the refrigerant, and then when the refrigerant flows to the first electronic expansion valve 7'3, it is apt to be gasified partly, therefore the throttling effect of the electronic expansion valve is adversely affected, and the system efficiency is reduced.

However, in the current market, some customers require to integrate the one-way valve with the electronic expansion valve, so as to reduce the numbers of parts and solder joints, and to further improve the reliability of the system.

In view of this, in the conventional technology, an electronic expansion valve with function of a one-way valve is disclosed in Japanese Patent Application Publication No. 2009-287913. Reference may be made to FIGS. 2 and 3. FIG. 2 is a schematic view showing the structure of an electronic expansion valve in the conventional technology which is performing a flow regulation when the refrigerant flows forwards; and FIG. 3 is a schematic view showing the structure of the electronic expansion valve in the conventional technology, wherein the electronic expansion valve is opened when the refrigerant flows reversely.

As shown in FIGS. 2 and 3, the electronic expansion valve in the conventional technology includes a valve seat 1'. The valve seat 1' is provided with a main valve cavity 1'1, a transverse connecting port 1'2 and a vertical connecting port 1'3, and an opening at an upper end of the vertical connecting port 1'3 forms a main valve port 1'31. A valve core seat 2' is provided inside the main valve cavity 1'1, and a circumferential side wall of the valve core seat 2' abuts against an inner circumferential side wall of the main valve cavity 1'1, thus the valve core seat 2' is guided by the main valve cavity 1'1 and may reciprocate along an axial direction of the main valve cavity 1'1, so as to open or close the main valve port 1'31. Further, as shown in FIGS. 2 and 3, the valve core seat 2' is provided with a secondary valve cavity 2'1, and a valve core valve port 2'2 in communication with the secondary valve cavity 2'1, and a valve needle component 3' extends into the secondary valve cavity 2'1 and reciprocates along an axial direction of the secondary valve cavity 2'1, so as to open or close the calve core valve port 2'2. Furthermore, as shown in FIGS. 2 and 3, the circumferential side wall of the valve core seat 2' is further provided with a communicating hole 2'3 in communication with the secondary valve cavity 2'1, and the communicating hole 2'3 faces the transverse connecting port 1'2, to allow the secondary valve cavity 2'1 to communicate with the transverse connecting port 1'2.

In addition, as shown in FIGS. 2 and 3, the transverse connecting port 1'2 is connected to a transverse connecting pipe 4'1, and the vertical connecting port 1'3 is connected to a vertical connecting pipe 4'2. The flow of the refrigerant fluid from the transverse connecting pipe 4'1 to the vertical connecting pipe 4'2 (i.e., a side of the transverse connecting port 1'2 is a high pressure zone, and a side of the vertical connecting port 1'3 is a low pressure zone) is defined as a forward flow, and the flow of the refrigerant fluid from the vertical connecting pipe 1'3 to the transverse connecting pipe 1'2 (i.e., the side of the vertical connecting port 1'3 is a high pressure zone, and the side of the transverse connecting port 1'2 is a low pressure zone) is defined as a reverse flow. The valve needle component 3' is connected to a screw rod 5'1, and the screw rod 5'1 cooperates with a nut 5'2 by screw threads. In such structure, a magnet 6'2 is rotated under the action of a magnetic field of a coil 6'1; and then the screw rod 5'1 is rotated and axially reciprocates due to the screw-thread fit with the nut 5'2, thereby driving the valve needle component 3' to reciprocate axially to open and close the valve bore valve port 2'2.

As shown in FIG. 2, when the refrigerant flows forward, the side of the transverse connecting port 1'2 is the high pressure zone, and the side of the vertical connecting port 1'3 is the low pressure zone. The valve core seat 2' moves downward under the action of a pressure difference of the refrigerant, thereby closing the main valve port 1'31. On this basis, the refrigerant enters into the secondary valve cavity 2'1 from the transverse connecting port 1'2 through the communicating hole 2'3, the valve needle component 3' opens the valve core valve port 2'2, and the refrigerant entered into the secondary valve cavity 2'1 flows to the vertical connecting port 1'3 via the valve core valve port 2'2, and in turn flows into the vertical connecting pipe 4'2. In this operation, the screw rod 5'1 moves axially to allow the valve needle component 3' to regulate an opening of the valve core valve port 2'2, thereby achieving an object of flow regulation of the electronic expansion valve.

As shown in FIG. 3, when the refrigerant flows reversely, the side of the vertical connecting port 1'3 is the high pressure zone, and the side of the transverse connecting port 1'2 is the low pressure zone. Here, the valve core seat 2' is pushed to move upward under the action of the pressure difference of the refrigerant, thereby opening the main valve port 1'31. The refrigerant flows through the main valve port 1'31, the main valve cavity 1'1 and the transverse connecting port 1'2 to the transverse connecting pipe 4'1, thereby achieving the function of one-way communication of the one-way valve.

However, the above electronic expansion valve in the conventional technology has the following defects.

Firstly, as shown in FIG. 2, when the refrigerant flows forward, the side wall of the valve core seat 2' faces the transverse connecting port 1'2, thus the circumferential side wall of the valve core seat 2' may be impacted by the refrigerant with high pressure. When the pressure of the refrigerant fluctuates, an eccentricity of the valve core seat 2' may be caused, thus the valve core seat 2' cannot tightly seal the main valve port 1'31, which causes a large internal leakage, and adversely affects the working performance of the system. Furthermore, the eccentricity of the valve core seat 2' may cause interference between the valve needle component 3' and the valve core valve port 2'2.

Secondly, as shown in FIG. 3, when the refrigerant flows reversely, the communicating hole 2'3 always remains open, thus a part of the refrigerant may enter into the secondary valve cavity 2'1 via the communicating hole 2'3. And, the refrigerant entered into the secondary valve cavity 2'1 will apply a downward action force on the valve core seat 2', thus only when the pressure of the refrigerant from the transverse connecting port 1'2 is large enough, the main valve port 1'31 can be opened stably, therefore the sensitivity of the opening of the main valve port 1'31 is not high.

SUMMARY

One technical problem to be solved by the present application is to provide an electronic expansion valve. The structural design of the electronic expansion valve may prevent an excessive impact on a valve core seat caused by the refrigerant with high pressure when the refrigerant flows forward, thereby preventing the eccentricity of the valve core seat, and avoiding an internal leakage, and ensuring the reliability of the operation of the system.

To solve the above technical problems, an electronic expansion valve is provided according to the present application, which includes a valve seat, a vertical connecting pipe and a transverse connecting pipe, the valve seat is provided with a main valve cavity; the electronic expansion valve further includes a main valve port in communication with the vertical connecting pipe and a valve core seat configured to open and close the main valve port, the valve core seat is provided with a valve core valve port which allows a communication with the vertical connecting pipe; and the electronic expansion valve further includes a valve needle component configured to open and close the valve core valve port, wherein, a sleeve is fixed in the main valve cavity, the valve core seat is axially movably arranged in the sleeve, and a lower portion of the valve needle component extends into the sleeve to open and close the valve core valve port; and a circumferential side wall of the sleeve is provided with a first communicating hole close to the main valve port and a second communicating hole away from the main valve port; and in a case that a fluid medium flows from the transverse connecting pipe to the vertical connecting pipe, the valve core seat closes the main valve port, a communication between the first communicating hole and the main valve port is disconnected, and meanwhile a sleeve upper cavity comes in communication with the main valve cavity via the second communicating hole; and in a case that the fluid medium flows from the vertical connecting pipe to the transverse connecting pipe, the valve core seat moves upward to open the main valve port, and the main valve port comes in communication with the main valve cavity via the first communicating hole.

Preferably, in a case that the valve core seat moves upward to open the main valve port, the valve needle component closes the valve core valve port, and meanwhile the valve core seat closes the second communicating hole to disconnect a communication between the sleeve upper cavity and the main valve cavity.

Preferably, a lower end of the sleeve is supported by the valve seat, and the lower end of the sleeve surrounds the main valve port.

Preferably, the valve seat is provided with a vertical connecting port for mounting the vertical connecting pipe, and the lower end of the sleeve extends into the vertical connecting port and is supported by the vertical connecting port; and an inner wall of the lower end of the sleeve forms a main valve hole, and the main valve port is formed by an aperture at an upper portion of the main valve hole.

Preferably, a circumferential outer wall of a lower end of the valve core seat forms a valve core seat sealing portion for opening and closing the main valve port.

Preferably, an inner wall of the vertical connecting port is provided with a connecting port stepped portion, an outer portion of the lower end of the sleeve is provided with a first sleeve stepped portion, and the first sleeve stepped portion is supported on the connecting port stepped portion.

Preferably, the outer portion of the lower end of the sleeve is further provided with a second sleeve stepped portion, the vertical connecting pipe is sleeved on the lower end of the sleeve, and a top end surface of the vertical connecting pipe abuts against both the second sleeve stepped portion and a lower end surface of the vertical connecting port.

Preferably, a valve core seat through hole is arranged axially in the valve core seat, and an aperture at an upper end of the valve core seat through hole forms the valve core valve port.

Preferably, the electronic expansion valve further includes a drive component for driving the valve needle component to reciprocate, and the drive component includes a screw rod and a nut which cooperates with the screw rod by screw threads; and a lower portion of the nut is provided with a nut inner guide hole, and an upper portion of the sleeve is provided with a sleeve outer guide portion fitted in the nut inner guide hole.

Preferably, a valve needle component guide hole, a valve core seat guide hole, and a main valve hole having an aperture at an upper end thereof to form the main valve port, are arranged coaxially inside the sleeve.

Preferably, a number of the first communicating holes and a number of the second communicating holes both range from 3 to 6, and a sum of flow areas of all the first communicating holes is greater than a sum of flow areas of all the second communicating holes.

Preferably, an upper side surface of an inner wall of the transverse connecting pipe is located between an upper side surface and a lower side surface of an inner wall of the second communicating hole in the axial direction, and a lower side surface of the inner wall of the transverse connecting pipe is located between an upper side surface and a lower side surface of an inner wall of the first communicating hole in the axial direction.

On the basis of the conventional technology, in the electronic expansion valve according to the present application, a sleeve is fixed in the main valve cavity. A lower end of the sleeve is supported by the valve seat, and the lower end of the sleeve surrounds the main valve port. The valve core seat is axially movably arranged in the sleeve, and a lower portion of the valve needle component extends into the sleeve to open and close the valve core valve port. A circumferential side wall of the sleeve is provided with a first communicating hole close to the main valve port and a second communicating hole away from the main valve port. When the valve core seat closes the main valve port, the communication between the first communicating hole and the main valve port is disconnected, and meanwhile a sleeve upper cavity comes in communication with the main valve cavity via the second communicating hole. When the valve core seat opens the main valve port, the main valve port comes in communication with the main valve cavity via the first communicating hole.

When the refrigerant flows forward, the side of the transverse connecting pipe is a high pressure zone, and the side of the vertical connecting pipe is a low pressure zone. The valve core seat moves downward under the action of a pressure difference of the refrigerant to close the main valve port. On this basis, the refrigerant enters into the sleeve upper cavity via the second communicating hole, and when the valve needle component opens the valve core valve port, the refrigerant in turn enters into the side of the vertical connecting pipe via the valve core valve port. In this process, the valve needle component may reciprocate axially with the screw rod, thereby regulating an opening of the valve core valve port, and achieving the object of flow regulation of the electronic expansion valve.

When the refrigerant flows reversely, the side of the vertical connecting pipe is a high pressure zone, and the side of the transverse connecting pipe is a low pressure zone. The valve core seat moves upward under the action of the pressure difference of the refrigerant, thereby opening the main valve port. The refrigerant passes through the main valve port, and then flows to the side of the transverse connecting pipe via the first communicating hole, thereby achieving the object of one-way communication of a one-way valve.

In the above operation, when the refrigerant flows forward, the valve core seat is arranged in the sleeve, and the sleeve is fixedly arranged in the main valve cavity, thus the pressure impact on the valve core seat from the high pressure refrigerant is largely borne by the sleeve, which significantly reduces the impact on the valve core seat, thereby preventing the eccentricity of the valve core seat, and avoiding an internal leakage, and ensuring the reliability of the operation of the system.

In summary, the electronic expansion valve according to the present application may prevent an excessive impact on the valve core seat caused by the refrigerant with high pressure, thereby preventing the eccentricity of the valve core seat, and avoiding an internal leakage, and ensuring the reliability of the operation of the system.

Figure 1:
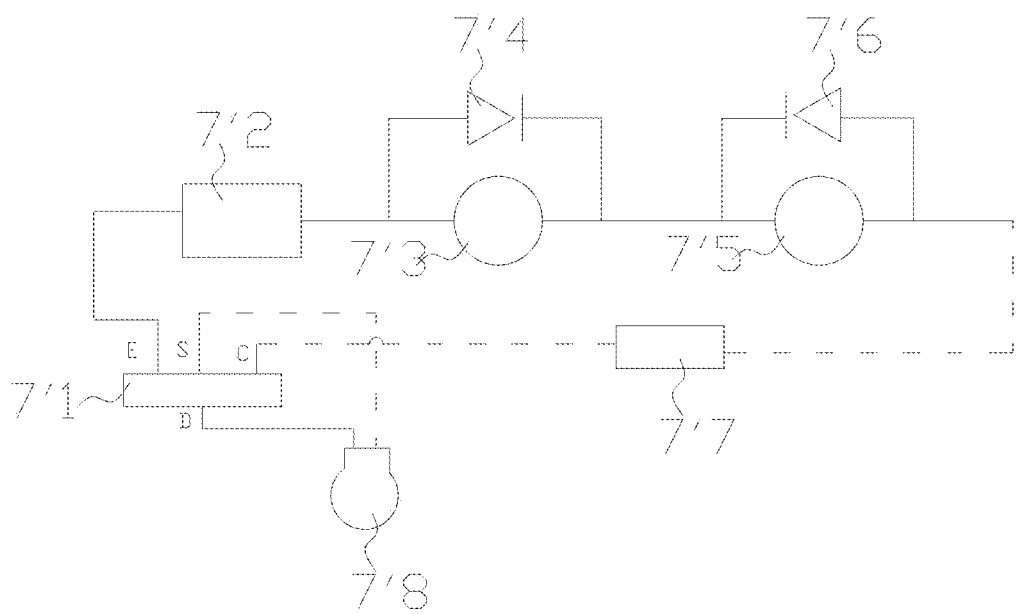
FIG. 1 is a schematic view showing the operating principle of an air conditioning refrigerating system in the conventional technology.
Figure 2:
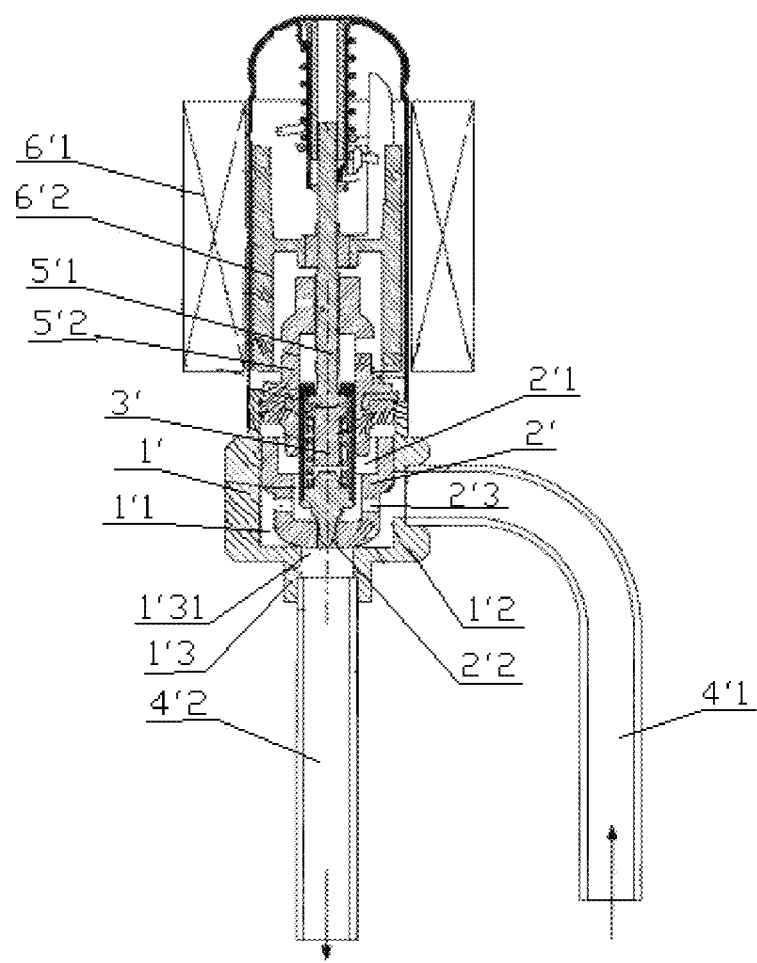
FIG. 2 is a schematic view showing the structure of an electronic expansion valve in the conventional technology which is performing a flow regulation when the refrigerant flows forwards.
Figure 3:
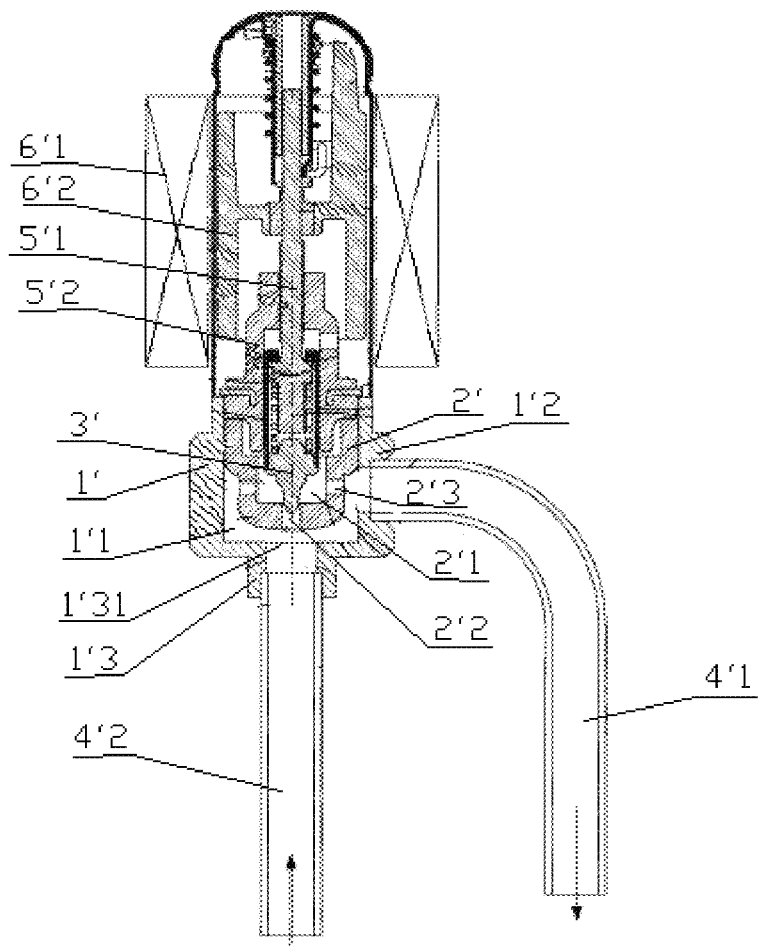
FIG. 3 is a schematic view showing the structure of the electronic expansion valve in the conventional technology, wherein the electronic expansion valve is opened when the refrigerant flows reversely.

Corresponding relationships between reference numerals and components in FIGS. 1 to 3 are as follows:

| 1' | valve seat, | 1'1 | main valve cavity, |
|---|---|---|---|
| 1'2 | transverse connecting port, | 1'3 | vertical connecting port; |
| 1'31 | main valve port; | 2' | valve core seat, |
| 2'1 | secondary valve cavity, | 2'2 | valve core valve port, |
| 2'3 | communicating hole; | 3' | valve needle component; |
| 4'1 | transverse connecting pipe, | 4'2 | vertical connecting pipe; |
| 5'1 | screw rod, | 5'2 | nut; |
| 6'1 | coil, | 6'2 | magnet; |
| 7'1 | four-way valve, | 7'2 | outdoor heat exchanger, |
| 7'3 | first electronic expansion valve, | 7'4 | first one-way valve, |
| 7'5 | second electronic expansion valve, | 7'6 | second one-way valve, |
| 7'7 | indoor heat exchanger, and | 7'8 | compressor. |

Corresponding relationships between reference numerals and components in FIGS. 4 to 8 are as follows:

| | | | |
|---|---|---|---|
| 1 | valve seat, | 11 | main valve cavity, |
| 12 | transverse connecting port, | 13 | vertical connecting port, |
| 131 | connecting port stepped portion; | 2 | valve core seat, |
| 21 | valve core valve port, | 22 | valve core seat sealing portion, |
| 23 | valve core seat through hole; | 3 | valve needle component; |
| 4 | sleeve, | 41 | first communicating hole, |
| 42 | second communicating hole, | 43 | sleeve upper cavity, |
| 44 | main valve hole, | 441 | main valve port, |
| 45 | first sleeve stepped portion, | 46 | second sleeve stepped portion, |
| 47 | sleeve outer guide portion, | 48 | valve needle component guide hole, |
| 49 | valve core seat guide hole; | 51 | vertical connecting pipe, |
| 52 | transverse connecting pipe; | 61 | screw rod, |
| 62 | nut, | 621 | nut inner guide hole; and |
| 71 | magnet. | | |

DETAILED DESCRIPTION

An object of the present application is to provide an electronic expansion valve. The structural design of the electronic expansion valve may prevent an excessive impact on a valve core seat caused by the refrigerant with high pressure when the refrigerant flows forward, thereby preventing the eccentricity of the valve core seat, and avoiding an internal leakage, and ensuring the reliability of the operation of the system.

For those skilled in the art to better understand technical solutions of the present application, the present application is described in detail in conjunction with drawings and embodiments hereinafter.

Figure 4:
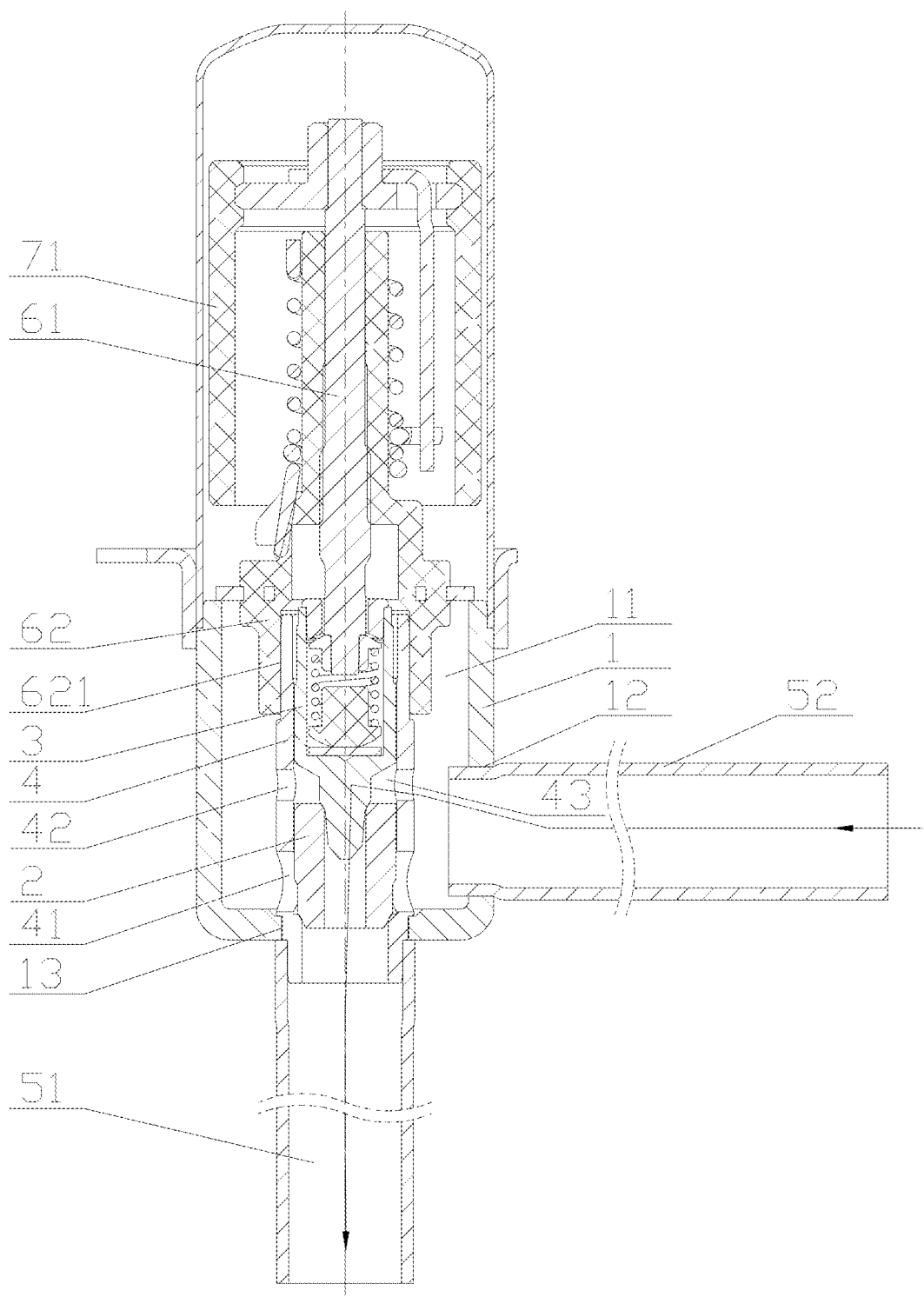
FIG. 4 is a schematic view showing the structure of an electronic expansion valve according to an embodiment of the present application which is performing a flow regulation when the refrigerant flows forwards.
Figure 5:
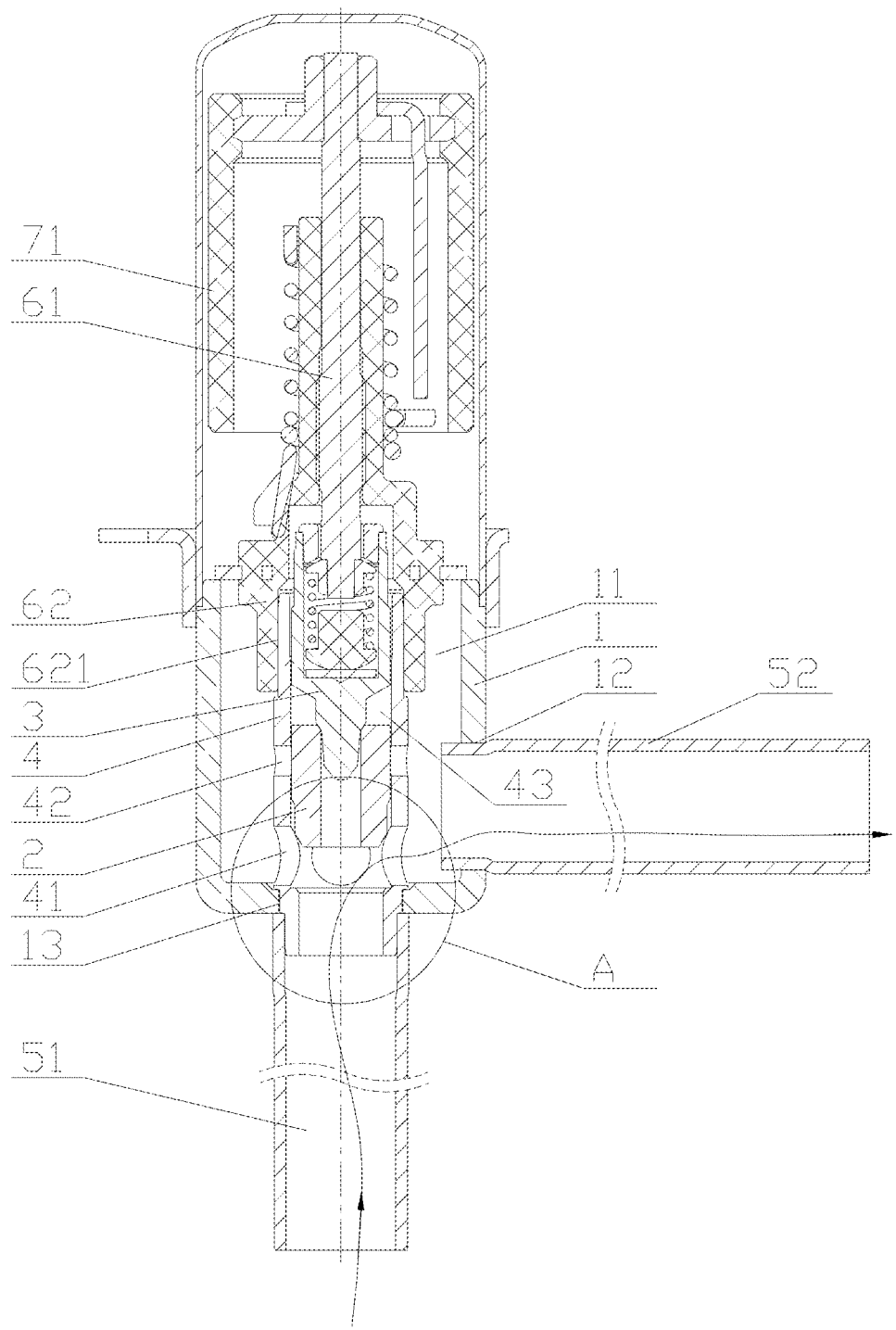
FIG. 5 is a schematic view showing the structure of the electronic expansion valve in FIG. 4, wherein the electronic expansion valve is opened when the refrigerant flows reversely.

Reference is made to FIGS. 4 and 5. FIG. 4 is a schematic view showing the structure of an electronic expansion valve according to an embodiment of the present application which is performing a flow regulation when the refrigerant flows forwards; and FIG. 5 is a schematic view showing the structure of the electronic expansion valve in FIG. 4, wherein the electronic expansion valve is opened when the refrigerant flows reversely.

In one embodiment, as shown in FIGS. 4 and 5, the electronic expansion valve according to the present application includes a valve seat 1. The valve seat 1 is provided with a main valve cavity 11, a transverse connecting port 12 and a vertical connecting port 13. A transverse connecting pipe 52 is installed at the transverse connecting port 12, and a vertical connecting pipe 51 is installed at the vertical connecting port 13. The electronic expansion valve further includes a main valve port 441 in communication with the vertical connecting pipe 51, and a valve core seat 2 configured to open and close the main valve port 441. The valve core seat 2 is provided with a valve core valve port 21 which allows a communication with the vertical connecting pipe 51. The electronic expansion valve further includes a valve needle component 3 configured to open and close the valve core valve port 21.

On the basis of the above structure, a sleeve 4 is fixed in the main valve cavity 11 as shown in FIGS. 4 and 5. Further, a lower end of the sleeve 4 may be supported by the valve seat 1, and the lower end of the sleeve 4 may surround the main valve port 441. The valve core seat 2 is axially movably arranged in the sleeve 4, and a lower portion of the valve needle component 3 extends into the sleeve 4 to open and close the valve core valve port 21. A circumferential side wall of the sleeve 4 is provided with a first communicating hole 41 close to the main valve port 441 and a second communicating hole 42 away from the main valve port 441. When the fluid medium flows from the transverse connecting pipe 52 to the vertical connecting pipe 51, the valve core seat 2 closes the main valve port 441, and the communication between the first communicating hole 41 and the main valve port 441 is disconnected, and meanwhile a sleeve upper cavity 43 comes in communication with the main valve cavity 11 via the second communicating hole 42. When the fluid medium flows from the vertical connecting pipe 51 to the transverse connecting pipe 52, the valve core seat 2 opens the main valve port 441, and the main valve port 441 comes in communication with the main valve cavity 11 via the first communicating hole 41.

When the refrigerant flows forward, the side of the transverse connecting pipe 52 is a high pressure zone, and the side of the vertical connecting pipe 51 is a low pressure zone. The valve core seat 2 moves downward under the action of a pressure difference of the refrigerant to close the main valve port 441. On this basis, the refrigerant enters into the sleeve upper cavity 43 via the second communicating hole 42, and when the valve needle component 3 opens the valve core valve port 21, the refrigerant in turn enters into the side of the vertical connecting pipe 51 via the valve core valve port 21. In this process, the valve needle component 3 may reciprocate axially with the screw rod 61, thereby regulating an opening of the valve core valve port 21, and achieving the object of flow regulation of the electronic expansion valve.

When the refrigerant flows reversely, the side of the vertical connecting pipe 51 is a high pressure zone, and the side of the transverse connecting pipe 52 is a low pressure zone. The valve core seat 2 moves upward under the action of the pressure difference of the refrigerant, thereby opening the main valve port 441. The refrigerant passes through the main valve port 441, and then flows to the side of the transverse connecting pipe 52 via the first communicating hole 41, thereby achieving the object of one-way communication of a one-way valve.

In the above operation, when the refrigerant flows forward, the valve core seat 2 is arranged in the sleeve 4, and the sleeve 4 is fixedly arranged in the main valve cavity 11, thus the pressure impact on the valve core seat 2 from the high pressure refrigerant is largely borne by the sleeve 4, which significantly reduces the impact on the valve core seat 2, thereby preventing the eccentricity of the valve core seat 2, and avoiding an internal leakage, and ensuring the reliability of the operation of the system.

In the above technical solution, further improvements may be made. For example, as shown in FIG. 5, when the valve core seat 2 opens the main valve port 441, the valve core seat 2 closes the second communicating hole 42 at the same time, so as to disconnect the communication between the sleeve upper cavity 43 and the main valve cavity 11. In such structure, when the refrigerant flows reversely as shown in FIG. 5, the valve core seat 2 moves upward and at the same time closes the second communicating hole 42, thus the refrigerant will not enter into the sleeve upper cavity 43 via the second communicating hole 42, and a refrigerant pressure which drives the valve core seat 2 to move downward will not be generated, thereby improving the sensitivity of the operation of the valve core seat 2 opening the main valve port 441.

Figure 6:
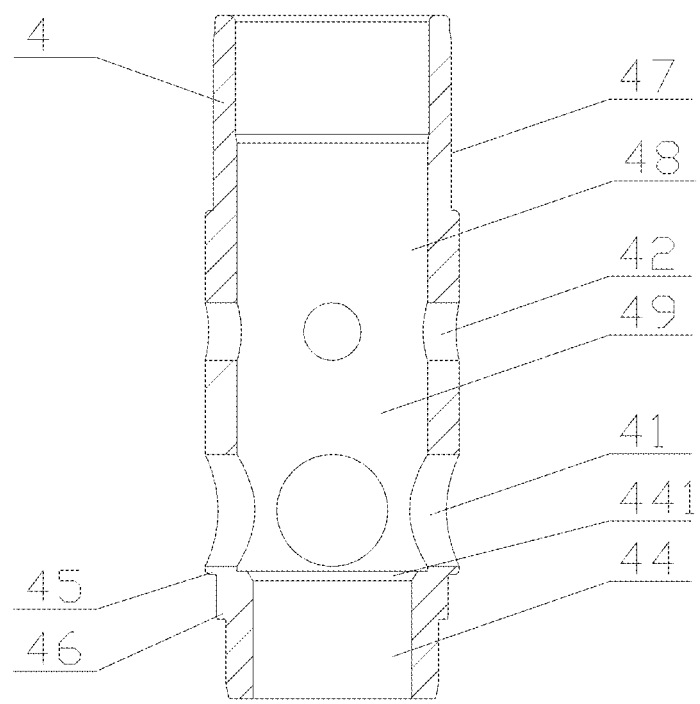
FIG. 6 is a schematic view showing the structure of a sleeve of the electronic expansion valve in FIGS. 4 and 5.
Figure 7:
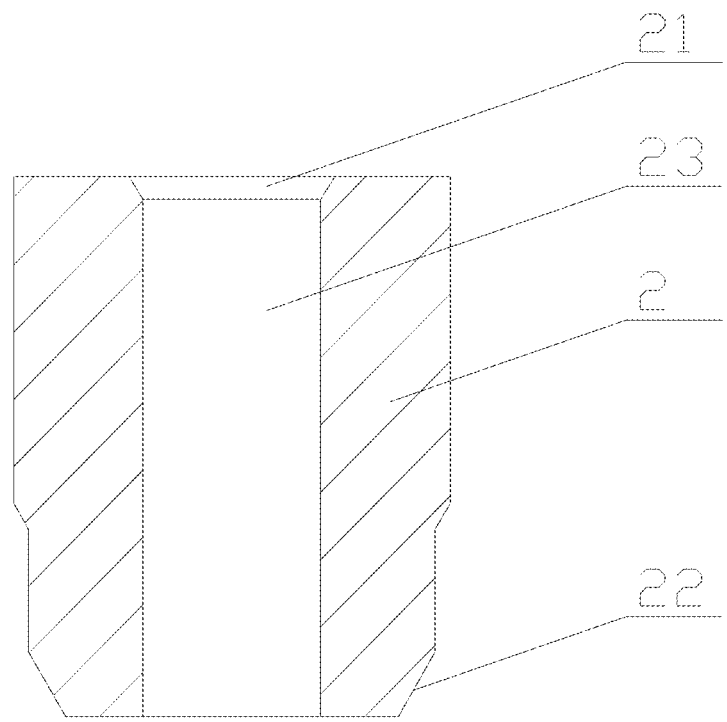
FIG. 7 is a schematic view showing the structure of a valve core seat of the electronic expansion valve in FIGS. 4 and 5.
Figure 8:
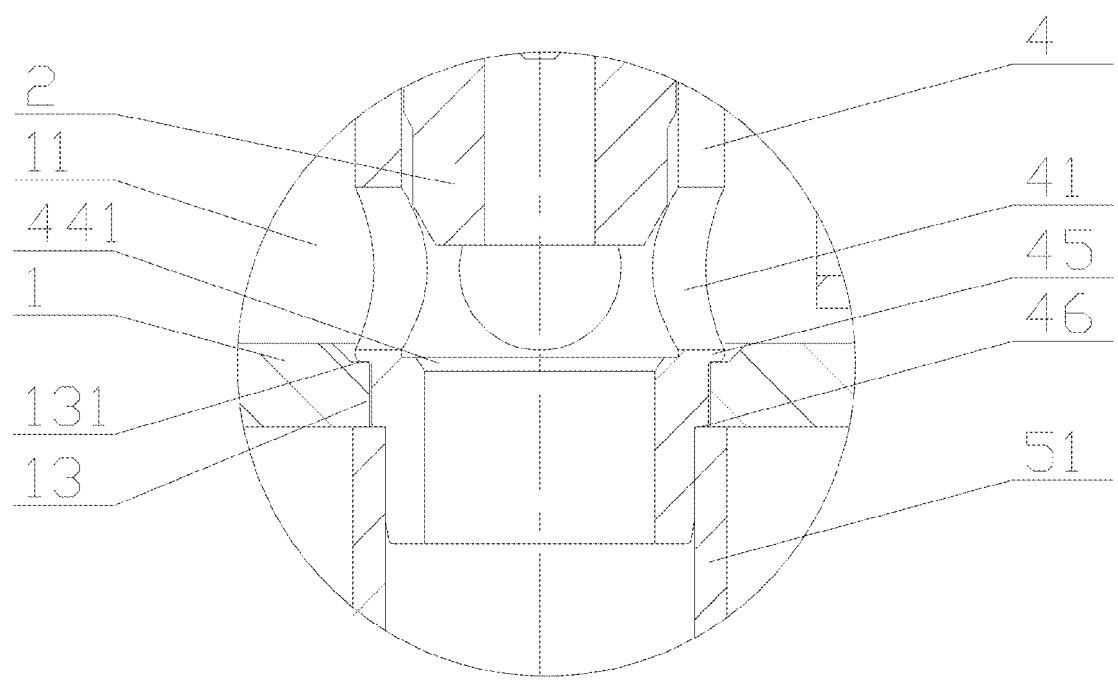
FIG. 8 is a partially enlarged view of portion A in FIG. 5.

Reference is made to FIGS. 6, 7 and 8. FIG. 6 is a schematic view showing the structure of the sleeve of the electronic expansion valve in FIGS. 4 and 5; FIG. 7 is a schematic view showing the structure of the valve core seat of the electronic expansion valve in FIGS. 4 and 5; and FIG. 8 is a partially enlarged view of portion A in FIG. 5.

In the above technical solution, the manner for forming the main valve port 441 may be specifically designed. For example, as shown in FIGS. 4 and 5, the lower end of the sleeve 4 extends into the vertical connecting port 13, and is supported by the vertical connecting port 13. An inner wall of the lower end of the sleeve 4 forms a main valve hole 44, and an aperture at an upper portion of the main valve hole 44 forms the main valve port 441. In such structure, the main valve port 441 is formed on the inner wall of the sleeve 4, and compared to the structure of the main valve port 441 being arranged in the valve seat 1, such structure may facilitate ensuring the concentricity between the valve core seat 2 in the sleeve 4 and the main valve port 441, thereby facilitating improving the sealing performance.

Apparently, the manners for forming the main valve port 441 are not limited in the present application, and as described above, any one of formation structures of the main valve port should be deemed to fall within the scope of the present application as long as the valve core seat 2 movable up and down in the sleeve 4 may close and open the main valve port. For example, the main valve port 441 may be formed by an aperture at an upper end of the vertical connecting port 13 as shown in FIGS. 2 and 3, and in such structure, the lower end of the sleeve 4 does not extend into the vertical connecting port 13, but is supported on an inner wall of the valve seat 1 near the vertical connecting port 13, therefore the valve core seat 2 movable in the sleeve 4 may still open and close the main valve port. Apparently, in such structure, in order to fix the sleeve 4 reliably, the inner wall of the valve seat 1 may be provided with a mounting groove surrounding the main valve port, and the lower end of the sleeve 4 may be fixed in the mounting groove.

In the above technical solution, as shown in FIG. 7, a circumferential outer wall of the lower end of the valve core seat 2 forms a valve core seat sealing portion 22 for opening and closing the main valve port 441. The valve core seat sealing portion 22 cooperates with the main valve port 441 in the sleeve 4 to realize the object of opening and closing.

In the above technical solution, a mounting structure between the lower end of the sleeve 4 and the vertical connecting port 13 may be specifically designed. For example, as shown in FIG. 8, the inner wall of the vertical connecting port 13 is provided with a connecting port stepped portion 131, an outer portion of the lower end of the sleeve 4 is provided with a first sleeve stepped portion 45, and the first sleeve stepped portion 45 is supported on the connecting port stepped portion 131. This structural design expediently achieves the axial support for the sleeve 4, and the reliability of this support is high.

Further, as shown in FIG. 8, the outer portion of the lower end of the sleeve 4 is further provided with a second sleeve stepped portion 46, and further, the second sleeve stepped portion 46 may be flush with a lower end surface of the vertical connecting port 13. The vertical connecting pipe 51 is sleeved on the lower end of the sleeve 4, and a top end surface of the vertical connecting pipe 51 abuts against both the second sleeve stepped portion 46 and the lower end surface of the vertical connecting port 13. This structural design expediently achieves installation and fixation between the vertical connecting port 13, the sleeve 4 and the vertical connecting pipe 51, and the reliability of this fixation is high.

In the above technical solution, as shown in FIG. 7, a valve core seat through hole 23 is arranged axially in the valve core seat 2, and an aperture at an upper end of the valve core seat through hole 23 forms the valve core valve port 21. The valve needle component 3 cooperates with the valve core valve port 21 to regulate the opening of the valve core valve port 21, thereby achieving the object of flow regulation of the electronic expansion valve. Furthermore, in this structural design, the valve core seat through hole 23 in the valve core seat 2 may have a large length, such as 5 mm, which allows the valve core seat 2 to be in a long cylindrical shape, thus the noise generated when the refrigerant passes through the valve core seat 2 may be reduced.

In the above technical solution, as shown in FIGS. 4 and 5, the electronic expansion valve further includes a drive component for driving the valve needle component 3 to reciprocate. The drive component includes a screw rod 61 and a nut 62 which cooperates with the screw rod 61 by screw threads. Under the action of a magnetic field of a coil, a magnet 71 rotates to drive the screw rod 61 to rotate, and under the action of the screw-thread fit with the nut 62, the screw rod 61 is moved in the axial direction, thus the valve needle component 3 is moved in the axial direction.

As shown in FIGS. 4 and 5, on the basis of the above structure, a lower portion of the nut 62 is provided with a nut inner guide hole 621, and an upper portion of the sleeve 4 is provided with an sleeve outer guide portion 47 fitted in the nut inner guide hole 621. Due to the cooperation between the nut inner guide hole 621 and the sleeve outer guide portion 47, a better concentricity between the sleeve 4 and the nut 62 is ensured, which in turn ensures a better concentricity between the sleeve 4 and the screw rod 61. Apparently, in such structure, it is also possible to arrange an sleeve inner guide hole in the upper portion of the sleeve 4 and a nut outer guide portion at an outer portion of the lower end of the nut 62, and to fit the nut outer guide portion in the sleeve inner guide hole.

As shown in FIGS. 4, 5 and 6, on the basis of the above structure, a valve needle component guide hole 48, a valve core seat guide hole 49, and a main valve hole 44 having an aperture at an upper end thereof to form the main valve port 441, are arranged coaxially inside the sleeve 4. The three holes may be formed integrally by lathing, thereby ensuring a good concentricity. In such structure, the valve needle component 3 is movable axially along the valve needle component guide hole 48, and the valve core seat 2 is movable along the valve core seat guide hole 49, thus a good concentricity between the valve needle component 3 and the valve core seat 2 may be ensured, which in turn improves the sealing performance between the valve needle component 3 and the valve core valve port 21. In addition, a good concentricity between the valve core seat 2 and the main valve port 441 may also be ensured, which also improves a sealing performance between the valve core seat 2 and the main valve port 441.

In the above technical solution, as shown in FIGS. 4 and 5, a distance between the first communicating hole 41 and the main valve hole 44 in the axial direction may be less than 1 mm, to reduce the resistance on the refrigerant flowing reversely. Further, as shown in FIGS. 4 and 5, an upper side surface of an inner wall of the transverse connecting pipe 52 is located between an upper side surface and a lower side surface of the inner wall of the second communicating hole 42 in the axial direction, which may allow the high pressure refrigerant flowed out of the transverse connecting pipe 52 to impact the sleeve 4 as much as possible, rather than impacting the valve core seat 2 through the second communicating hole 42. Furthermore, a lower side surface of the inner wall of the transverse connecting pipe 52 is located between an upper side surface and a lower side surface of the inner wall of the first communicating hole 41 in the axial direction, which may reduce the resistance on the refrigerant when flowing reversely.

Furthermore, in any one of the above technical solutions, the first communicating holes 41 and the second communicating holes 42 may be uniformly arranged in the circumferential direction of the sleeve 4, and the number of the first communicating holes 41 and the number of the second communicating holes 42 may both be 3 to 6. The refrigerant enters into or flows out of the sleeve 4 through the porous structure, thereby reducing the noise. And further, a sum of flow areas of all the first communicating holes 41 is greater than a sum of flow areas of all the second communicating holes 42.

An electronic expansion valve according to the present application is described in detail hereinbefore. The principle and the embodiments of the present application are illustrated herein by specific examples. The above description of examples is only intended to help the understanding of the method and idea of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An electronic expansion valve, comprising a valve seat, a vertical connecting pipe and a transverse connecting pipe, the valve seat being provided with a main valve cavity; the electronic expansion valve further comprising a main valve port in communication with the vertical connecting pipe and a valve core seat configured to open and close the main valve port, the valve core seat being provided with a valve core valve port which allows a communication with the vertical connecting pipe; and the electronic expansion valve further comprising a valve needle component configured to open and close the valve core valve port, wherein, a sleeve is fixed in the main valve cavity, the valve core seat is axially movably arranged in the sleeve, and a lower portion of the valve needle component extends into the sleeve to open and close the valve core valve port; and a circumferential side wall of the sleeve is provided with a first communicating hole close to the main valve port and a second communicating hole away from the main valve port; and in a case that a fluid medium flows from the transverse connecting pipe to the vertical connecting pipe, the valve core seat closes the main valve port, a communication between the first communicating hole and the main valve port is disconnected, and meanwhile a sleeve upper cavity comes in communication with the main valve cavity via the second communicating hole; and in a case that the fluid medium flows from the vertical connecting pipe to the transverse connecting pipe, the valve core seat moves upward to open the main valve port, and the main valve port comes in communication with the main valve cavity via the first communicating hole.

2. The electronic expansion valve according to claim 1, wherein a valve core seat through hole is arranged axially in the valve core seat, and an aperture at an upper end of the valve core seat through hole forms the valve core valve port.

3. The electronic expansion valve according to claim 1, wherein a number of the first communicating holes and a number of the second communicating holes both range from 3 to 6, and a sum of flow areas of all the first communicating holes is greater than a sum of flow areas of all the second communicating holes.

4. The electronic expansion valve according to claim 1, wherein an upper side surface of an inner wall of the transverse connection pipe is located between an upper side surface and a lower side surface of an inner wall of the second communicating hole in the axial direction, and a lower side surface of the inner wall of the transverse connecting pipe is located between an upper side surface and a lower side surface of an inner wall of the first communicating hole in the axial direction.

5. The electronic expansion valve according to claim 1, wherein the electronic expansion valve further comprises a drive component for driving the valve needle component to reciprocate, and the drive component comprises a screw rod and a nut which cooperates with the screw rod by screw threads; and a lower portion of the nut is provided with a nut inner guide hole, and an upper portion of the sleeve is provided with a sleeve outer guide portion fitted in the nut inner guide hole.

6. The electronic expansion valve according to claim 5, wherein a valve needle component guide hole, a valve core seat guide hole, and a main valve hole having an aperture at an upper end thereof to form the main valve port, are arranged coaxially inside the sleeve.

7. The electronic expansion valve according to claim 1, wherein a lower end of the sleeve is supported by the valve seat, and the lower end of the sleeve surrounds the main valve port.

8. The electronic expansion valve according to claim 7, wherein the valve seat is provided with a vertical connecting port for mounting the vertical connecting pipe, and the lower end of the sleeve extends into the vertical connecting port and is supported by the vertical connecting port; and an inner wall of the lower end of the sleeve forms a main valve hole, and the main valve port is formed by an aperture at an upper portion of the main valve hole.

9. The electronic expansion valve according to the claim 8, wherein a circumferential outer wall of a lower end of the valve core seat forms a valve core seat sealing portion for opening and closing the main valve port.

10. The electronic expansion valve according to claim 8, wherein an inner wall of the vertical connecting port is provided with a connecting port stepped portion, an outer portion of the lower end of the sleeve is provided with a first sleeve stepped portion, and the first sleeve stepped portion is supported on the connecting port stepped portion.

11. The electronic expansion valve according to claim 10, wherein the outer portion of the lower end of the sleeve is further provided with a second sleeve stepped portion, the vertical connecting pipe is sleeved on the lower end of the sleeve, and a top end surface of the vertical connecting pipe abuts against both the second sleeve stepped portion and a lower end surface of the vertical connecting port.

12. The electronic expansion valve according to claim 1, wherein in a case that the valve core seat moves upward to open the main valve port, the valve needle component closes the valve core valve port, and meanwhile the valve core seat closes the second communicating hole to disconnect a communication between the sleeve upper cavity and the main valve cavity.

13. The electronic expansion valve according to claim 12, wherein a valve core seat through hole is arranged axially in the valve core seat, and an aperture at an upper end of the valve core seat through hole forms the valve core valve port.

14. The electronic expansion valve according to claim 12, wherein a number of the first communicating holes and a number of the second communicating holes both range from 3 to 6, and a sum of flow areas of all the first communicating holes is greater than a sum of flow areas of all the second communicating holes.

15. The electronic expansion valve according to claim 12, wherein an upper side surface of an inner wall of the transverse connecting pipe is located between an upper side surface and a lower side surface of an inner wall of the second communicating hole in the axial direction, and a lower side surface of the inner wall of the transverse connecting pipe is located between an upper side surface and a lower side surface of an inner wall of the first communicating hole in the axial direction.

16. The electronic expansion valve according to claim 12, wherein a lower end of the sleeve is supported by the valve seat, and the lower end of the sleeve surrounds the main valve port.

17. The electronic expansion valve according to claim 16, wherein the valve seat is provided with a vertical connecting port for mounting the vertical connecting pipe, and the lower end of the sleeve extends into the vertical connecting port and is supported by the vertical connecting port; and an inner wall of the lower end of the sleeve forms a main valve hole, and the main valve port is formed by an aperture at an upper portion of the main valve hole.

18. The electronic expansion valve according to the claim 17, wherein a circumferential outer wall of a lower end of the valve core seat forms a valve core seat sealing portion for opening and closing the main valve port.

19. The electronic expansion valve according to claim 17, wherein an inner wall of the vertical connecting port is provided with a connecting port stepped portion, an outer portion of the lower end of the sleeve is provided with a first sleeve stepped portion, and the first sleeve stepped portion is supported on the connecting port stepped portion.

20. The electronic expansion valve according to claim 19, wherein the outer portion of the lower end of the sleeve is further provided with a second sleeve stepped portion, the vertical connecting pipe is sleeved on the lower end of the sleeve, and a top end surface of the vertical connecting pipe abuts against both the second sleeve stepped portion and a lower end surface of the vertical connecting port.

* * * * *